(12) United States Patent
Li et al.

(10) Patent No.: US 12,345,922 B2
(45) Date of Patent: Jul. 1, 2025

(54) GRATING STRUCTURE, PREPARATION METHOD THEREOF AND DISPLAY DEVICE

(71) Applicant: BOE Technology Group Co., Ltd., Beijing (CN)

(72) Inventors: Duohui Li, Beijing (CN); Hong Chen, Beijing (CN); Mengya Song, Beijing (CN); Dongliang Zhang, Beijing (CN); Xiao Zhang, Beijing (CN); Zheng Duan, Beijing (CN); Kang Guo, Beijing (CN); Xin Gu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,936

(22) PCT Filed: May 27, 2022

(86) PCT No.: PCT/CN2022/095703
§ 371 (c)(1),
(2) Date: Mar. 28, 2023

(87) PCT Pub. No.: WO2023/226018
PCT Pub. Date: Nov. 30, 2023

(65) Prior Publication Data
US 2024/0361531 A1    Oct. 31, 2024

(51) Int. Cl.
*G02B 6/34* (2006.01)
*B29C 33/38* (2006.01)
(Continued)

(52) U.S. Cl.
CPC ............ *G02B 6/34* (2013.01); *B29C 33/3842* (2013.01); *B29C 33/405* (2013.01);
(Continued)

(58) Field of Classification Search
CPC .............................. G02B 6/34; B29K 2821/00
See application file for complete search history.

(56) References Cited

U.S. PATENT DOCUMENTS

| 2007/0008597 | A1 | 1/2007 | Watanabe et al. |
| 2013/0299796 | A1* | 11/2013 | Masuyama ............ B82Y 40/00 359/569 |

(Continued)

FOREIGN PATENT DOCUMENTS

| CN | 103901516 A | 7/2014 |
| CN | 105929475 A | 9/2016 |

(Continued)

*Primary Examiner* — Sung H Pak
(74) *Attorney, Agent, or Firm* — IPro, PLLC

(57) ABSTRACT

Provided in the present disclosure are a grating structure, a preparation method thereof and a display device. The preparation method of the grating structure includes: forming a plurality of first convex structures arranged in a first direction; and forming a first rubber material at least covering the plurality of first convex structures, and forming the grating structure including a plurality of second convex structures by using convex structures including the first convex structures and the first rubber material, wherein a surface of the first rubber material facing away from the first convex structures is a flat surface, and the convex structures including the first convex structures and the first rubber material are in one-to-one correspondence with the second convex structures, shapes of cross sections of the second convex structures in the first direction are triangles, and the second convex structures have at least one inclined flat surface.

15 Claims, 8 Drawing Sheets

(51) Int. Cl.
  *B29C 33/40*    (2006.01)
  *B29C 59/02*    (2006.01)
  *G02B 27/01*    (2006.01)
  *B29L 11/00*    (2006.01)

(52) U.S. Cl.
  CPC .......... *B29C 59/022* (2013.01); *B29C 59/026* (2013.01); *G02B 27/0172* (2013.01); *B29K 2821/00* (2013.01); *B29K 2995/0094* (2013.01); *B29L 2011/00* (2013.01)

(56) References Cited

U.S. PATENT DOCUMENTS

| | | | |
|---|---|---|---|
| 2014/0175045 | A1 | 6/2014 | Zhu et al. |
| 2018/0059297 | A1 | 3/2018 | Peroz et al. |

FOREIGN PATENT DOCUMENTS

| | | | |
|---|---|---|---|
| CN | 106680922 | A | 5/2017 |
| CN | 108873134 | A | 11/2018 |
| CN | 109863446 | A | 6/2019 |
| CN | 110596802 | A | 12/2019 |
| JP | 2000105307 | A | 4/2000 |
| JP | 2010101965 | A | 5/2010 |

\* cited by examiner

GRATING STRUCTURE, PREPARATION METHOD THEREOF AND DISPLAY DEVICE

CROSS REFERENCE TO RELATED APPLICATIONS

The present disclosure is a US National Stage of International Application No. PCT/CN2022/095703, filed on May 27, 2022, the entire contents of which are incorporated herein by reference.

FIELD

The present disclosure relates to the technical field of display, in particular to a grating structure, a preparation method thereof and a display device.

BACKGROUND

Augmented reality (AR) glasses are predicted to become a "third screen" of human beings and have a very broad development prospect. A surface relief grating (SRG) diffraction optical waveguide solution is considered to be the most potential mainstream AR optical waveguide lens preparation solution in the future due to its easy mass production and excellent performance. An SRG AR optical waveguide two-dimensional grating mainly includes a rectangular grating, an inclined grating and a blazed grating. The blazed grating has been widely concerned due to its excellent diffraction efficiency.

At present, main methods of preparing a blazed grating template include diamond machining, wet etching, electron beam direct writing and the like. Diamond machining is limited by a size of a tool, and the tool is prone to wear in a machining process, which affects machining precision. Wet etching preparation of the blazed grating is limited by crystal orientation of a material, and a grating angle cannot be flexibly selected. Electron beam direct writing needs to use a gradient exposure process, and an inclined plane of the grating is wavy, which affects waveguide efficiency.

SUMMARY

A method for preparing a grating structure provided by an embodiment of the present disclosure includes: forming a plurality of first convex structures arranged in a first direction; and forming a first rubber material at least covering the plurality of first convex structures, and forming the grating structure including a plurality of second convex structures by using convex structures including the plurality of first convex structures and the first rubber material, wherein a surface of the first rubber material facing away from the first convex structures is a flat surface; and the convex structures including the plurality of first convex structures and the first rubber material are in one-to-one correspondence with the plurality of second convex structures, shapes of cross sections of the plurality of second convex structures in the first direction are triangles, and the plurality of second convex structures have at least one inclined flat surface.

In some embodiments, the forming the plurality of first convex structures arranged in the first direction includes: providing a first substrate, and manufacturing the plurality of first convex structures arranged in the first direction on the first substrate; and forming the first rubber material at least covering the plurality of first convex structures, and forming the grating structure including the plurality of second convex structures by using the convex structures including the plurality of first convex structures and the first rubber material include: forming the first rubber material covering the plurality of first convex structures, and performing a curing process on the first rubber material to form the convex structures including the plurality of first convex structures and the first rubber material, so as to obtain a first template, wherein shapes of cross sections of the convex structures in the first direction are triangles, and the convex structures have at least one inclined flat surface; and providing a second rubber material, using the first template as an imprinting template, adopting an imprinting process to make the second rubber material form the plurality of second convex structures in one-to-one correspondence with the convex structures, and transferring the plurality of second convex structures to a second substrate to obtain the grating structure.

In some embodiments, the using the first template as the imprinting template, and adopting the imprinting process to make the second rubber material form the plurality of second convex structures in one-to-one correspondence with the convex structures, include: coating one side of the first rubber material facing away from the plurality of first convex structures with a template rubber material, using the first template as the imprinting template, and adopting the imprinting process to make the template rubber material form a second template, wherein the second template includes first grooves in complementary correspondence with the convex structures, shapes of cross sections of the first grooves in the first direction are triangles, and the first grooves have at least one inclined flat surface; and coating one side of the second template having the first grooves with the second rubber material, using the second template as the imprinting template, and adopting the imprinting process to make the second rubber material form the plurality of second convex structures in complementary correspondence with the first grooves.

In some embodiments, the manufacturing the plurality of first convex structures arranged in the first direction on the first substrate includes: manufacturing the plurality of first convex structures on the first substrate by using an electron beam direct writing process, wherein cross section shapes of the plurality of first convex structures are a shape constructed by a plurality of rectangles arranged closely in sequence; and in a direction perpendicular to the first substrate, thicknesses of the plurality of rectangles are not completely equal, the plurality of rectangles include: a first rectangle with a maximum thickness and a second rectangle, on one side of the first rectangle and not adjacent to the first rectangle, with a minimum thickness, and thicknesses of the first rectangle, a rectangle between the first rectangle and the second rectangle, and the second rectangle decrease in sequence.

In some embodiments, the manufacturing the plurality of first convex structures arranged in the first direction on the first substrate includes: manufacturing the plurality of first convex structures including a plurality of strip structures on the first substrate by using an electron beam direct writing process; wherein the plurality of strip structures are arranged at intervals in the first direction, shapes of cross sections of the plurality of strip structures are rectangles; in a direction perpendicular to the first substrate, thicknesses of the plurality of strip structures are not completely equal, the plurality of strip structures include: a first strip structure with a maximum thickness and a second strip structure, on one side of the first strip structure and not adjacent to the first strip structure, with a minimum thickness, and thicknesses of the first strip structure, a strip structure between the first strip structure and the second strip structure, and the second strip structure decrease in sequence.

In some embodiments, the forming the plurality of first convex structures arranged in the first direction includes: providing a first substrate, and manufacturing a plurality of third convex structures arranged in the first direction on the first substrate to obtain a third template; and using the third template and adopting an imprinting process to make a third rubber material form the plurality of first convex structures in one-to-one correspondence with the plurality of third convex structures, and transferring the plurality of first convex structures to a second substrate; and forming the first rubber material at least covering the plurality of first convex structures, and forming the grating structure including the plurality of second convex structures by using the convex structures including the plurality of first convex structures and the first rubber material include: coating one sides of the plurality of first convex structures facing away from the second substrate with the first rubber material, and performing a curing process on the first rubber material to form the convex structures including the first rubber material and the plurality of first convex structures as the plurality of second convex structures, so as to obtain the grating structure.

In some embodiments, the using the third template and adopting the imprinting process to make the third rubber material form the plurality of first convex structures in one-to-one correspondence with the plurality of third convex structures, and transferring the plurality of first convex structures to the second substrate include: coating one sides of the plurality of third convex structures with a template rubber material, using the third template as an imprinting template, and adopting an imprinting process to make the template rubber material form a fourth template, wherein the fourth template includes second grooves in complementary correspondence with the plurality of third convex structures; and coating one side of the fourth template having the second grooves with the third rubber material, using the fourth template as the imprinting template, adopting the imprinting process to make the third rubber material form the plurality of first convex structures in complementary correspondence with the second grooves, and transferring the plurality of first convex structures to the second substrate.

In some embodiments, the manufacturing the plurality of third convex structures arranged in the first direction on the first substrate includes: manufacturing the plurality of third convex structures on the first substrate by using an electron beam direct writing process, wherein cross section shapes of the plurality of third convex structures are a shape constructed by a plurality of rectangles arranged closely in sequence; and in a direction perpendicular to the first substrate, thicknesses of the plurality of rectangles are not completely equal, the plurality of rectangles include: a first rectangle with a maximum thickness and a second rectangle, on one side of the first rectangle and not adjacent to the first rectangle, with a minimum thickness, and thicknesses of the first rectangle, a rectangle between the first rectangle and the second rectangle, and the second rectangle decrease in sequence.

In some embodiments, the manufacturing the plurality of third convex structures arranged in the first direction on the first substrate includes: manufacturing the plurality of third convex structures including a plurality of strip structures on the first substrate by using an electron beam direct writing process; wherein the plurality of strip structures are arranged at intervals in the first direction, shapes of cross sections of the plurality of strip structures in the first direction are rectangles; in a direction perpendicular to the first substrate, thicknesses of the plurality of strip structures are not completely equal, the plurality of strip structures include: a first strip structure with a maximum thickness and a second strip structure, on one side of the first strip structure and not adjacent to the first strip structure, with a minimum thickness, and thicknesses of the first strip structure, a strip structure between the first strip structure and the second strip structure, and the second strip structure decrease in sequence.

In some embodiments, a distance between two adjacent strip structures is greater than or equal to 30 nm and less than or equal to 200 nm.

In some embodiments, a period of the grating structure is greater than or equal to 300 nm and less than or equal to 600 nm.

In some embodiments, a maximum thickness of the second convex structures is greater than or equal to 300 nm and less than or equal to 600 nm.

A grating structure provided by the embodiment of the present disclosure is prepared by adopting the preparation method of the grating structure provided by the embodiment of the present disclosure.

The grating structure includes: the plurality of second convex structures arranged in the first direction, shapes of cross sections of the plurality of second convex structures in the first direction are triangles, and the plurality of second convex structures have at least one inclined flat surface.

A display device provided by an embodiment of the present disclosure includes: a display panel; an optical transmission layer, located on a light emission side of the display panel; and the grating structure provided by the embodiment of the present disclosure, located on one side of the optical transmission layer facing the display panel.

In some embodiments, the grating structure is a coupled-in grating of the display device; and/or, the grating structure is a coupled-out grating of the display device; and the display device further includes: a reflective layer located on one side of the grating structure facing away from the optical transmission layer.

BRIEF DESCRIPTION OF THE DRAWINGS

In order to illustrate the technical solutions in the embodiments of the present disclosure more clearly, accompanying drawings needing to be used in description of the embodiments will be introduced below briefly. Apparently, the accompanying drawings in the following description are only some embodiments of the present disclosure, those ordinarily skilled in the art can further obtain other accompanying drawings according to these accompanying drawings without inventive efforts.

DETAILED DESCRIPTION OF THE EMBODIMENTS

In order to make objectives, technical solutions and advantages of the embodiments of the present disclosure clearer, the technical solutions of the embodiments of the present disclosure will be described clearly and completely with reference to accompanying drawings of the embodiments of the present disclosure. Apparently, the described embodiments are part of the embodiments of the present disclosure, but not all the embodiments. The embodiments in the present disclosure and features in the embodiments may be mutually combined in the case of no conflict. On the basis of the described embodiments of the present disclosure, all other embodiments obtained by those ordinarily skilled in the art without inventive efforts fall within the scope of protection of the present disclosure.

Unless otherwise defined, the technical or scientific terms used in the present disclosure shall have the usual meanings understood by a person of ordinary skill in the art to which the present disclosure belongs. "First", "second" and similar words used in the present disclosure do not indicate any order, quantity or importance, but are only used to distinguish different components. The word "including" or "containing" and the like, means that an element or item preceding the word covers an element or item listed after the word and the equivalent thereof, without excluding other elements or items. "Connection" or "coupling" and similar words are not restricted to physical or mechanical connection, but may include electrical connection, whether direct or indirect.

It should be noted that sizes and shapes of all graphs in the accompanying drawings do not reflect the true scale, and only intend to illustrate the content of the present disclosure. The same or similar reference numbers represent the same or similar elements or elements with the same or similar functions from beginning to end.

Figure 1:
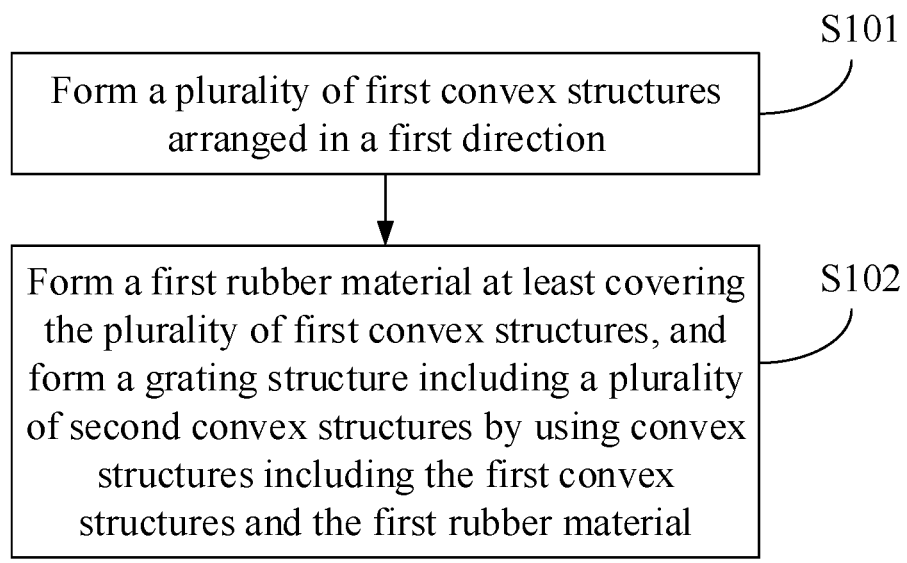
FIG. 1 is a schematic flow diagram of a preparation method of a grating structure provided by an embodiment of the present disclosure.

An embodiment of the present disclosure provides a method for preparing a grating structure, as shown in FIG. 1, including:

S101, a plurality of first convex structures arranged in a first direction are formed; and S102, a first rubber material at least covering the plurality of first convex structures is formed, and the grating structure including a plurality of second convex structures is formed by using convex structures including the first convex structures and the first rubber material, wherein a surface of the first rubber material facing away from the first convex structures is a flat surface; and the convex structures including the first convex structures and the first rubber material are in one-to-one correspondence with the second convex structures, shapes of cross sections of the second convex structures in the first direction are triangles, and the second convex structures have at least one inclined flat surface.

It should be noted that the grating structure includes the plurality of second convex structures, the shapes of the cross sections of the second convex structures in the first direction are triangles, and a cross section of the grating structure including the plurality of second convex structures has a zigzag shape. When the cross section of the grating structure has the zigzag shape, light energy of the grating structure is concentrated in a predetermined direction, namely, at a certain spectrum level. When detected from this direction, a spectral intensity is the largest. This phenomenon is called blazing, and this kind of grating structure is called blazed grating. That is, the grating structure obtained by adopting the method for preparing the grating structure provided by the embodiments of the present disclosure is the blazed grating.

It should be noted that during specific implementation, contour shapes of the first convex structures are roughly triangles, that is, contours of the first convex structures have inclined planes. Due to a process and other factors, the inclined planes corresponding to the first convex structures are prone to be uneven, and forming the grating structure by directly using the first convex structures is prone to affecting the waveguide efficiency of the grating structure.

According to the method for preparing the grating structure provided by the embodiments of the present disclosure, the first convex structures are covered with the first rubber material, even if the inclined planes of the first convex structures are uneven surfaces, because the first rubber material has fluidity, after the first rubber material covers the first convex structures, the fluidity of the first rubber material makes a surface of the first rubber material facing away from the first convex structures be a flat surface, so that surfaces of the convex structures composed of the first rubber material and the first convex structures may be flat surfaces. When the second convex structures are formed by using the convex structures composed of the first convex structures and the first rubber material, the inclined surfaces of the second convex structures are made to be flat, so as to avoid affecting the waveguide efficiency of the grating structure.

In some embodiments, shapes of cross sections of the convex structures composed of the first convex structures and the first rubber material in the first direction are triangles.

In some embodiments, a triangle of the cross sections of the convex structures composed of the first convex structures and the first rubber material in the first direction are roughly congruent with a triangle of the cross sections of the second convex structures in the first direction. It should be noted that the rough congruence refers to that: the triangle of the cross sections of the convex structures composed of the first convex structures and the first rubber material in the first direction is congruent with the triangle of the cross sections of the second convex structures in the first direction, or, a size difference between the triangle of the cross sections of the convex structures composed of the first convex structures and the first rubber material in the first direction and the triangle of the cross sections of the second convex structures in the first direction is considered to be congruent in a case of meeting a process error.

Figure 2:
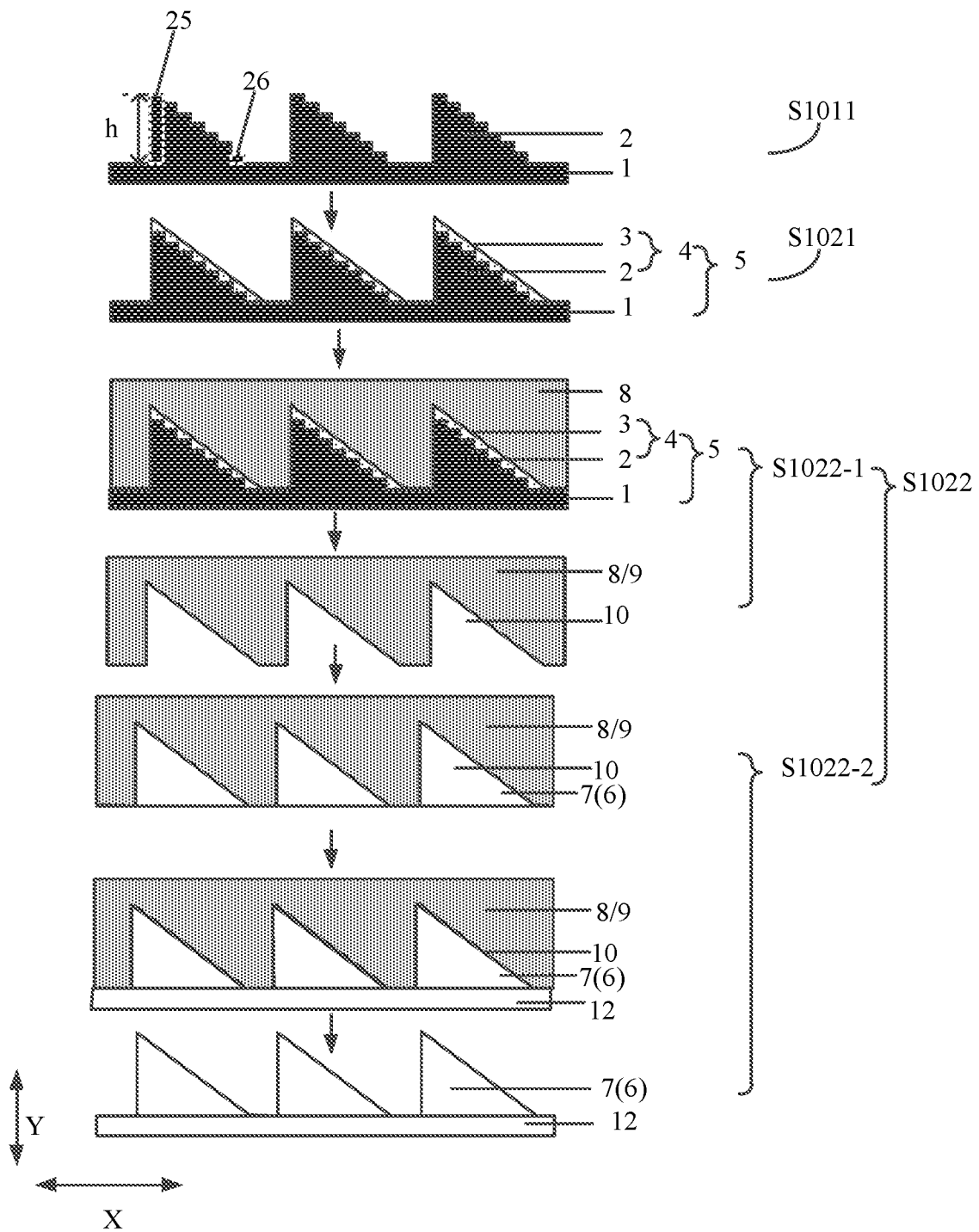
FIG. 2 is a schematic flow diagram of a preparation method of another grating structure provided by an embodiment of the present disclosure.
Figure 3:
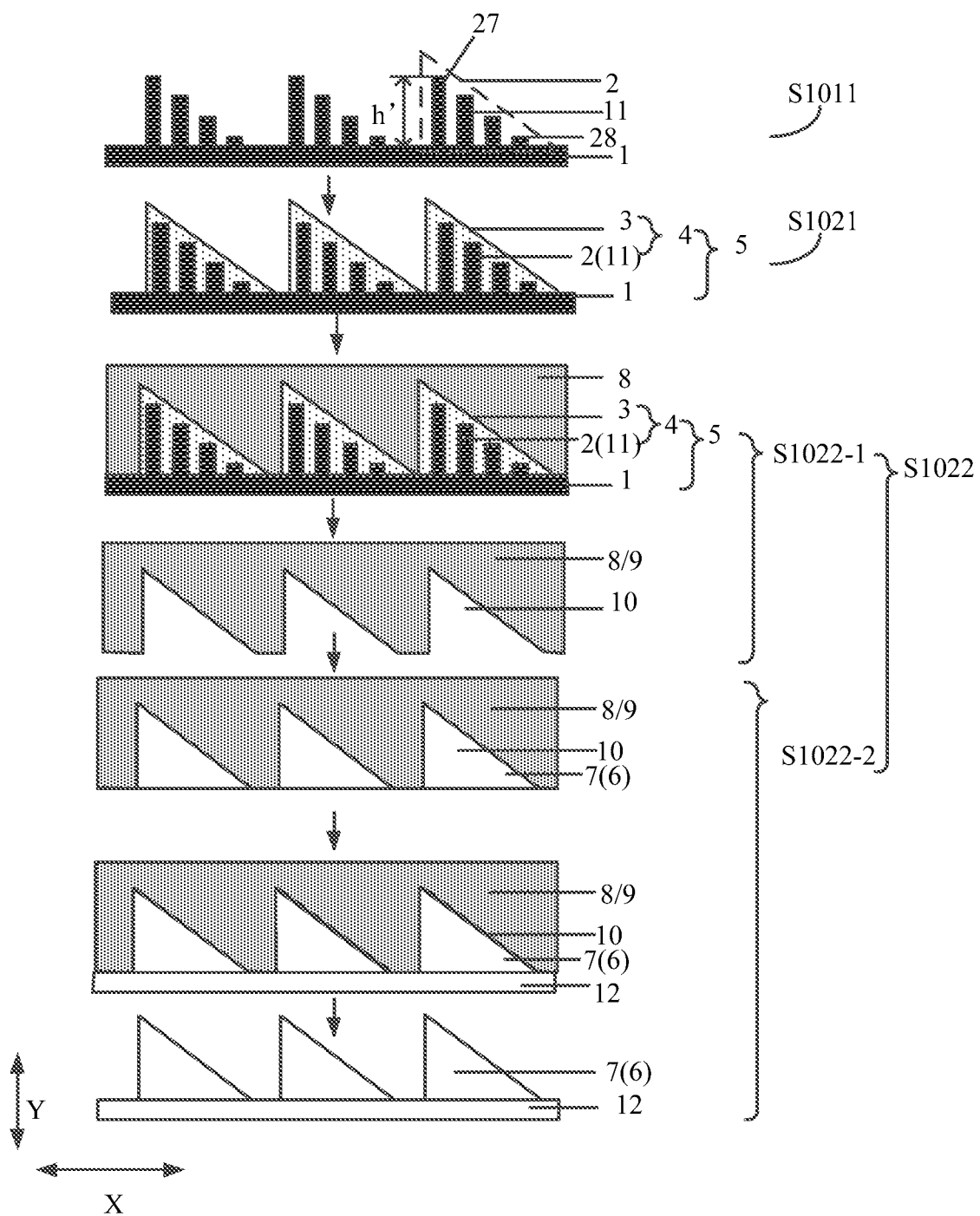
FIG. 3 is a schematic flow diagram of a preparation method of yet another grating structure provided by an embodiment of the present disclosure.

In some embodiments, as shown in FIG. 2 and FIG. 3, S101, the forming the plurality of first convex structures arranged in the first direction includes:

S1011, a first substrate 1 is provided, and the plurality of first convex structures 2 arranged in the first direction X are manufactured on the first substrate 1.

S102, the forming the first rubber material at least covering the plurality of first convex structures, and forming the grating structure by using the convex structures composed of the first convex structures and the first rubber material include:

S1021, the first rubber material 3 covering the first convex structures 2 is formed, and a curing process is performed on the first rubber material 3 to form the plurality of convex structures including the first convex structures 2 and the first rubber material 3, so as to obtain a first template 5; and for the convenience of distinguishing, the plurality of convex structures including the first convex structures 2 and the first rubber material 3 formed in this step are named as fourth convex structures 4, wherein shapes of cross sections of the fourth convex structures 4 in the first direction X are triangles, and the fourth convex structures 4 have at least one inclined flat surface; and S1022, a second rubber material 6 is provided, the first template 5 is used as an imprinting template, an imprinting process is adopted to make the second rubber material 6 form the second convex structures 7 in one-to-one correspondence with the fourth convex structures 4, and transferring the second convex structures 7 to a second substrate 12 to obtain the grating structure.

In some embodiments, as shown in FIG. 2 and FIG. 3, S1022, the using the first template as the imprinting template, and adopting the imprinting process to make the second rubber material form the second convex structures in one-to-one correspondence with the fourth convex structures, include:

S1022-1, one side of the first rubber material 3 facing away from the first convex structures 2 is coated with a template rubber material 8, the first template 5 is used as the imprinting template, and the imprinting process is adopted to make the template rubber material 8 form a second template 9, wherein the second template 9 includes first grooves 10 in complementary correspondence with the fourth convex structures 4, shapes of cross sections of the first grooves in the first direction X are triangles, and the first grooves 10 have at least one inclined flat surface; and S1022-2, one side of the second template 9 having the first grooves 10 is coated with the second rubber material 6, the second template 9 is used as the imprinting template to perform the imprinting process so as to make the second rubber material 6 form the second convex structures 7 in complementary correspondence with the first grooves 10.

In some embodiments, a refractive index of the second rubber material is equal to a refractive index of the second substrate.

During specific implementation, the second substrate is, for example, a glass substrate. The refractive index of the second rubber material is equal to a refractive index of the glass substrate.

In some embodiments, as shown in FIG. 2, S1011, the manufacturing the plurality of first convex structures arranged in the first direction on the first substrate includes:

the plurality of first convex structures 2 are manufactured on the first substrate 1 by using an electron beam direct writing process, wherein shapes of cross sections of the first convex structures 2 are a shape constructed by a plurality of rectangles arranged closely in sequence; and in a direction Y perpendicular to the first substrate, thicknesses h of the plurality of rectangles are not completely equal, the plurality of rectangles include: a first rectangle 25 with a maximum thickness and a second rectangle 26, on one side of the first rectangle 25 and not adjacent to the first rectangle 25, with a minimum thickness, and thicknesses of the first rectangle 25, a rectangle between the first rectangle 25 and the second rectangle 26, and the second rectangle 26 decrease in sequence.

It should be noted that only the thickness of the first rectangle 25 is shown in FIG. 2.

As shown in FIG. 2, the shapes of the cross sections of the first convex structures are roughly triangles. That is, the contours of the first convex structures have the inclined planes. Due to the process and other factors, the inclined planes corresponding to the first convex structures are prone to having an uneven phenomenon of steps. Therefore, the shapes of the cross sections of the first convex structures are the shape constructed by the plurality of rectangles arranged closely in sequence. That is, as shown in FIG. 2, bevels of the cross sections of the first convex structures are not in a straight line shape but in a zigzag shape, and a bevel with an included angle between the triangle and the first direction being greater than 0 and less than 90 degrees is zigzag. That is, the inclined surfaces of the first convex structures are the uneven surfaces of the step surfaces. When the first rubber material covers the inclined surfaces of the first convex structures, due to fluidity of the first rubber material, the first rubber material may fill the stepped surfaces, thus forming the inclined planes with the flat surfaces on one side of the first rubber material facing away from the first convex structures.

Alternatively, in some embodiments, as shown in FIG. 3, S1011, the manufacturing the plurality of first convex structures arranged in the first direction on the first substrate includes:

the first convex structures 2 including a plurality of strip structures 11 are manufactured on the first substrate 1 by using an electron beam direct writing process, wherein the plurality of strip structures 11 are arranged at intervals in the first direction X, a shape of a cross section of each strip structure 11 is a rectangle; in a direction Y perpendicular to the first substrate, thicknesses h' of the plurality of strip structures 11 are not completely equal, the plurality of strip structures 11 include: a first strip structure 27 with a maximum thickness and a second strip structure 28, on one side of the first strip structure 27 and not adjacent to the first strip structure 27, with a minimum thickness, and thicknesses of the first strip structure 27, a strip structure 11 between the first strip structure 27 and the second strip structure 28, and the second strip structure 28 decrease in sequence.

It should be noted that only the thickness of the first strip structure 27 is shown in FIG. 3.

In some embodiments, widths of the plurality of strip structures in the first direction are the same.

The first convex structures include the plurality of strip structures, which are equivalent to the first convex structures including the grating. The thicknesses of the strip structures are not completely the same. The grating included by the first convex structures is used as a frame, and a contour of the frame is roughly triangular. When the first rubber material covers the plurality of strip structures, due to the fluidity of the first rubber material and a close distance between the adjacent strip structures, the first rubber material may fill a gap of the strip structures, so that the plurality of strip structures are connected through the first rubber material, and a bevel plane with the flat surface is formed on one sides of the strip structures with thickness change.

In some embodiments, a sum of a distance between two adjacent strip structures in the first direction and widths of the strip structures is greater than or equal to 30 nm and less than or equal to 200 nm. That is, a period of the grating included by the first convex structures is greater than or equal to 30 nm and less than or equal to 200 nm.

In some embodiments, a difference between the thicknesses of two adjacent strip structures in a direction perpendicular to the first direction is greater than or equal to 30 nm and less than or equal to 600 nm.

It should be noted that illustration is made in FIG. 2 and FIG. 3 by taking an example that the convex structures including the first convex structures and the first rubber material are taken as a template to prepare the grating structure with the second convex structures. During specific implementation, other methods may further be used to obtain the grating structure by using the convex structures including the first convex structures and the first rubber material.

Figure 4:
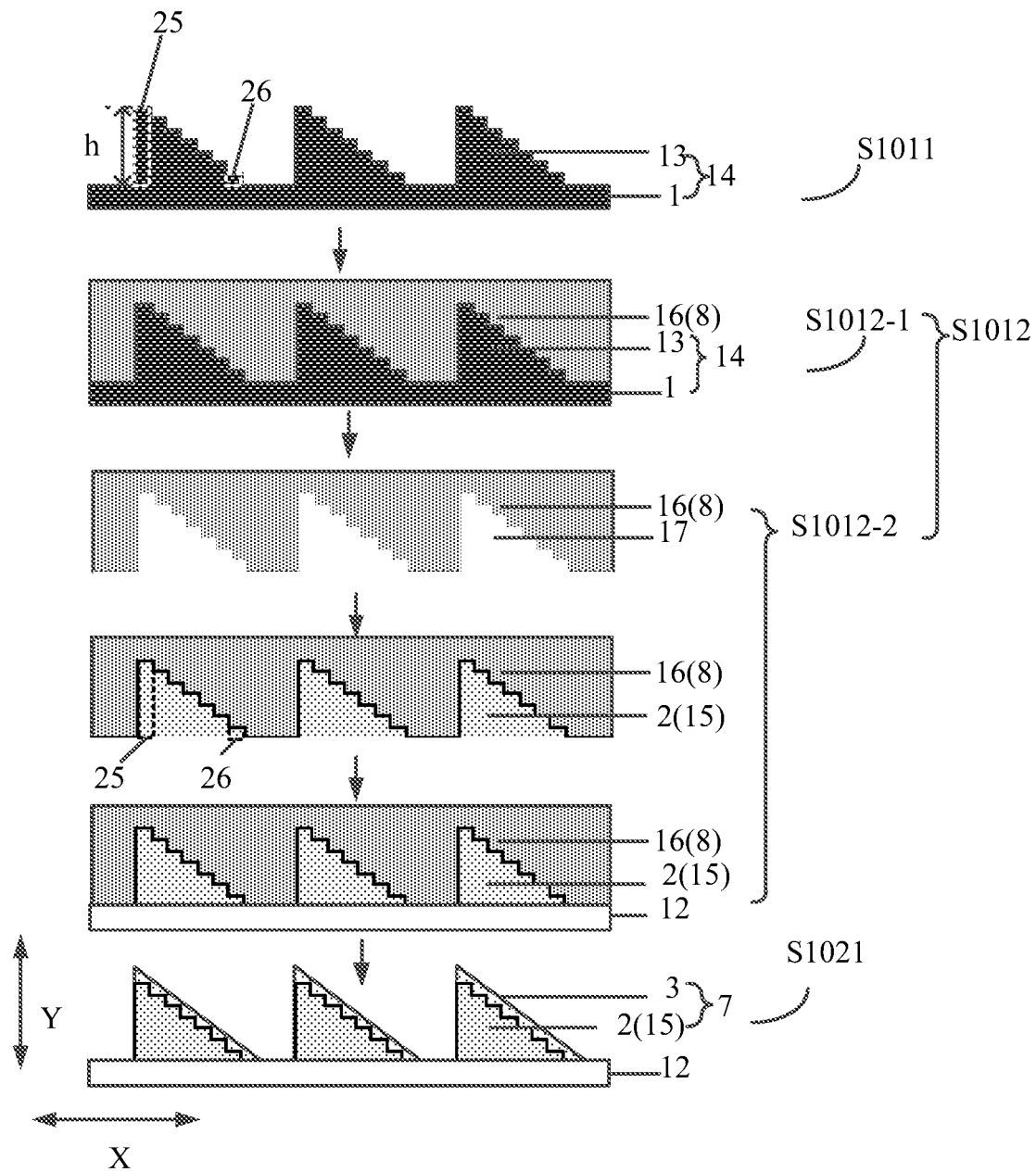
FIG. 4 is a schematic flow diagram of a preparation method of yet another grating structure provided by an embodiment of the present disclosure.
Figure 5:
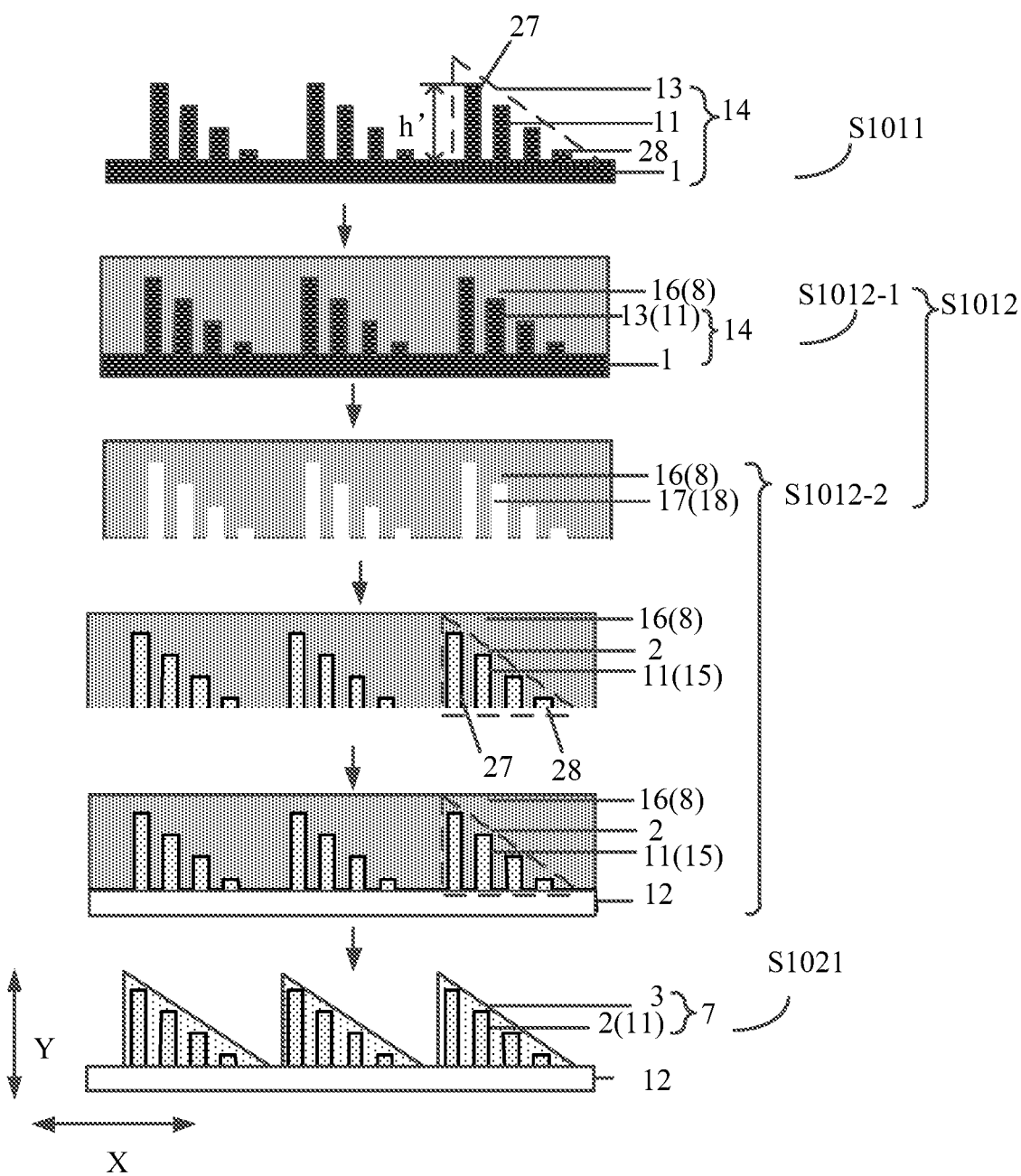
FIG. 5 is a schematic flow diagram of a preparation method of yet another grating structure provided by an embodiment of the present disclosure.

In some embodiments, as shown in FIG. 4 and FIG. 5, S101, the forming the plurality of first convex structures arranged in the first direction includes:
  S1011, a first substrate 1 is provided, and a plurality of third convex structures 13 arranged in the first direction X are manufactured on the first substrate 1 to obtain a third template 14; and
  S1012, the third template 14 is used and an imprinting process is adopted to make a third rubber material 15 form the first convex structures 2 in one-to-one correspondence with the third convex structures 13, and the first convex structures 2 are transferred to a second substrate 12.
  S102, forming the first rubber material at least covering the plurality of first convex structures, and forming the grating structure including the plurality of second convex structures by using the convex structures including the first convex structures and the first rubber material include:
  S1021, one sides of the first convex structures 2 facing away from the second substrate 12 are coated with the first rubber material 3, and a curing process is performed on the first rubber material 3 to form the convex structures including the first rubber material 3 and the first convex structures 2 as the second convex structures 7, so as to obtain the grating structure.

In some embodiments, a refractive index of the third rubber material is equal to the refractive index of the second substrate.

In some embodiments, the second substrate is a glass substrate. Accordingly, the refractive index of the third rubber material is equal to a refractive index of the glass substrate.

In some embodiments, materials of the first rubber material and the third rubber material are the same. Alternatively, the materials of the first rubber material and the third rubber material are different, but the refractive indexes of the first rubber material and the third rubber material are the same. Alternatively, the materials of the first rubber material and the third rubber material are different, but the refractive index of the first rubber material is greater than the refractive index of the third rubber material.

In some embodiments, as shown in FIG. 4 and FIG. 5, S1012, the using the third template and adopting the imprinting process to make the third rubber material form the first convex structures in one-to-one correspondence with the third convex structures, and transferring the first convex structures to the second substrate include:
  S1012-1, one sides of the third convex structures 13 are coated with a template rubber material 8, the third template 14 is used as an imprinting template, and an imprinting process is adopted to make the template rubber material 8 form a fourth template 16, wherein the fourth template 16 includes second grooves 17 in complementary correspondence with the third convex structures 13; and
  S1012-2, one side of the fourth template 16 having the second grooves 17 is coated with the third rubber material 15, the fourth template 16 is used as the imprinting template, the imprinting process is adopted to make the third rubber material 15 form the first convex structures 2 in complementary correspondence with the second grooves 17, and the first convex structures 2 are transferred to the second substrate 12.

In some embodiments, as shown in FIG. 4, S1012, the manufacturing the plurality of third convex structures arranged in the first direction on the first substrate includes:
  the plurality of third convex structures 13 with the cross sections being roughly triangular are manufactured on the first substrate 1 by using the electron beam direct writing process, wherein shapes of cross sections of the third convex structures 13 are a shape constructed by a plurality of rectangles arranged closely in sequence; and in a direction Y perpendicular to the first substrate, thicknesses h of the plurality of rectangles are not completely equal, the plurality of rectangles include: a first rectangle 25 with a maximum thickness and a second rectangle 26, on one side of the first rectangle 25 and not adjacent to the first rectangle 25, with a minimum thickness, and thicknesses of the first rectangle 25, a rectangle between the first rectangle 25 and the second rectangle 26, and the second rectangle 26 decrease in sequence.

It should be noted that only the thickness of the first rectangle 25 is shown in FIG. 4.

As shown in FIG. 4, the shapes of the cross sections of the third convex structures are roughly triangles. That is, contours of the third convex structures have the inclined planes. Due to the process and other factors, the inclined planes corresponding to the third convex structures are prone to having an uneven phenomenon of steps. Therefore, the cross section shapes of the third convex structures are the shape composed of the plurality of rectangles arranged closely in sequence. As shown in FIG. 4, bevels of the third convex structures 13 are not in a straight line shape but in a zigzag shape, and a bevel with an included angle between the triangle and the first direction being greater than 0 and less than 90 degrees is zigzag. That is, the inclined surfaces of the third convex structures 13 are the uneven surfaces of the step surfaces.

Accordingly, the cross sections of the second grooves 17 complementary to the third convex structures 13 in the first direction X are roughly triangular, and the bevels of the triangle are not in a straight line shape but in a zigzag shape. The shapes of the cross sections of the first convex structures 2 complementary to the second grooves 17 in the first direction X are roughly triangles, and the bevels of the triangle are not in a straight line shape but in a zigzag shape, that is, the inclined surfaces of the first convex structures are uneven surfaces of the step surfaces. As shown in FIG. 4, the cross section shapes of the first convex structures 2 are the shape composed of the plurality of rectangles arranged closely in sequence; and in a direction Y perpendicular to the second substrate, the thicknesses of the plurality of rectangles are not completely equal, the plurality of rectangles include: a first rectangle 25 with the maximum thickness and a second rectangle 26, on one side of the first rectangle 25 and not adjacent to the first rectangle 25, with the minimum thickness, and thicknesses of the first rectangle 25, a rectangle between the first rectangle 25 and the second rectangle 26, and the second rectangle 26 decrease in sequence. When the first rubber material covers the inclined surfaces of the first convex structures, due to fluidity of the first rubber material, the first rubber material may fill the step surfaces, thus forming the inclined planes with the flat surfaces on one side of the first rubber material facing away from the first convex structures.

Alternatively, in some embodiments, as shown in FIG. 5, S1012, the manufacturing the plurality of third convex structures arranged in the first direction on the first substrate includes:

the third convex structures 13 including a plurality of strip structures 11 are manufactured on the first substrate 1 by using an electron beam direct writing process, wherein the plurality of strip structures 11 are arranged at intervals in the first direction X, a shape of a cross section of each strip structure 11 is a rectangle, in a direction Y perpendicular to the first substrate, thicknesses of the plurality of strip structures 11 are not completely equal, the plurality of strip structures 11 include: a first strip structure 27 with a maximum thickness and a second strip structure 28, on one side of the first strip structure 27 and not adjacent to the first strip structure 27, with a minimum thickness, and thicknesses of the first strip structure 27, a strip structure 11 between the first strip structure 27 and the second strip structure 28, and the second strip structure 28 decrease in sequence.

It should be noted that only the thickness of the first strip structure 27 is shown in FIG. 5.

In some embodiments, widths of the plurality of strip structures in the first direction are the same.

It should be noted that the third convex structures include the plurality of strip structures, which are equivalent to the first convex structures including the grating. The thicknesses of the strip structures are not completely the same. That is, the grating included by the third convex structures is used as a frame, and a contour of the frame is roughly triangular. Accordingly, as shown in FIG. 5, the second grooves 17 complementary to the third convex structures 13 include a plurality of strip sub-grooves 18, and the first convex structures 2 complementary to the second grooves 17 also include the plurality of strip structures 11. The plurality of strip structures 11 are arranged at intervals in the first direction X, a shape of a cross section of each strip structure 11 is a rectangle, in a direction Y perpendicular to the second substrate, thicknesses of the plurality of strip structures 11 are not completely equal, the plurality of strip structures 11 include: a first strip structure 27 with a maximum thickness and a second strip structure 28, on one side of the first strip structure 27 and not adjacent to the first strip structure 27, with a minimum thickness, and thicknesses of the first strip structure 27, a strip structure 11 between the first strip structure 27 and the second strip structure 28, and the second strip structure 28 decrease in sequence. When the first rubber material covers the plurality of strip structures of the first convex structures, due to the fluidity of the first rubber material and a close distance between the adjacent strip structures, the first rubber material may fill a gap of the strip structures, so that the plurality of strip structures are connected through the first rubber material, and a bevel plane with the flat surface is formed on one side of the strip structures with thickness change.

In some embodiments, a sum of a distance between two adjacent strip structures in the first direction and widths of the strip structures is greater than or equal to 30 nm and less than or equal to 200 nm. That is, a period of the grating included by the first convex structures is greater than or equal to 30 nm and less than or equal to 200 nm.

In some embodiments, a difference between the thicknesses of two adjacent strip structures in a direction perpendicular to the first direction is greater than or equal to 30 nm and less than or equal to 600 nm.

It should be noted that illustration is made in FIG. 2 to FIG. 5 by taking an example that the shapes of the cross sections of the second convex structures are right triangles and the right angle sides are perpendicular to the first direction. That is, each second convex structure has one inclined surface. Certainly, during specific implementation, the second convex structures may have two inclined surfaces. The shapes of the cross sections of the second convex structures may be right triangles or non-right triangles. When the shapes of the cross sections of the second convex structures are the right triangles, there are included angles between the right angle sides of the right triangles and the first direction.

Based on the same inventive concept, an embodiment of the present disclosure further provides a grating structure. The grating structure is prepared by adopting the method for preparing the grating structure provided by the embodiments of the present disclosure.

Figure 6:
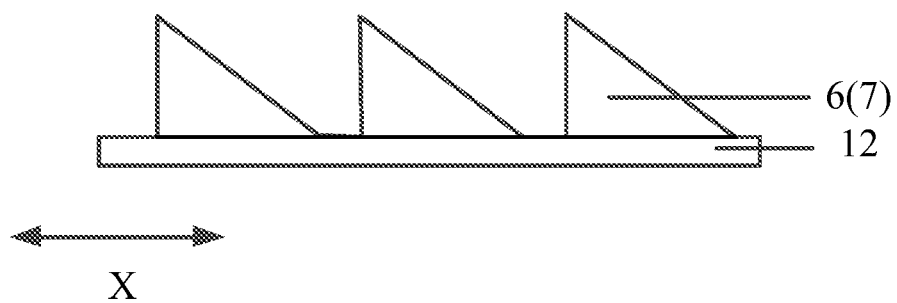
FIG. 6 is a schematic structural diagram of a grating structure provided by an embodiment of the present disclosure.
Figure 7:
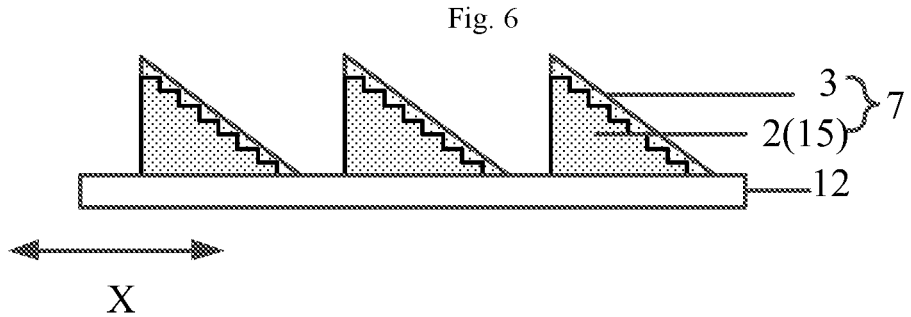
FIG. 7 is a schematic structural diagram of another grating structure provided by an embodiment of the present disclosure.

As shown in FIG. 6 and FIG. 7, the grating structure includes: a plurality of second convex structures 7 arranged in a first direction X, shapes of cross sections of the second convex structures 7 in the first direction X are triangles, and the second convex structures 7 have at least one inclined flat surface.

Figure 8:
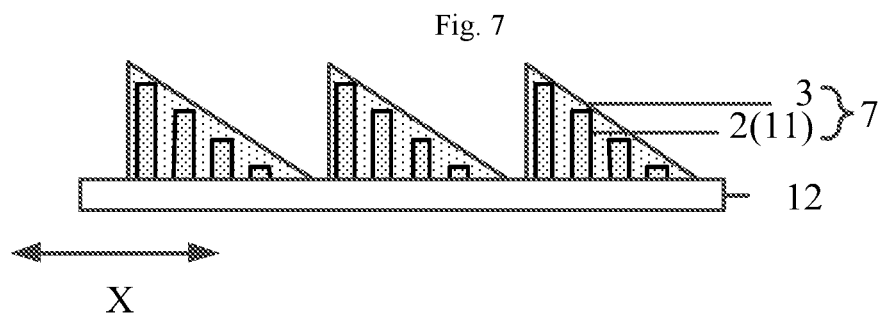
FIG. 8 is a schematic structural diagram of yet another grating structure provided by an embodiment of the present disclosure.

In some embodiments, as shown in FIG. 6, FIG. 7 and FIG. 8, the grating structure further includes: a second substrate 12.

In some embodiments, as shown in FIG. 6, the second convex structures 7 include: a second rubber material 6 located on one side of the second substrate 12.

In some embodiments, as shown in FIG. 7 and FIG. 8, the second convex structures 7 include: first convex structures 2 located on one side of the second substrate 12 and a first rubber material 3 covering the first convex structures 2 on one side of the first convex structures 2 facing away from the second substrate 12.

During specific implementation, the first convex structures include a third rubber material, that is, the second convex structures include the third rubber material and the first rubber material.

In some embodiments, as shown in FIG. 7, the shapes of the cross sections of the first convex structures 2 in the first direction X are roughly triangles. In FIG. 7, bevels of the cross sections of the first convex structure 2 in the first direction X are in a zigzag shape.

Alternatively, in some embodiments, as shown in FIG. 8, the first convex structures 2 include a plurality of strip structures 11 arranged at intervals in the first direction X; a thickness of each strip structure 11 in different regions is the same; in a direction Y perpendicular to the second substrate, thicknesses of the plurality of strip structures 11 are not completely equal, the plurality of strip structures 11 include: a first strip structure 27 with a maximum thickness and a second strip structure 28, on one side of the first strip structure 27 and not adjacent to the first strip structure 27, with a minimum thickness, and thicknesses of the first strip structure 27, a strip structure 11 between the first strip structure 27 and the second strip structure 28, and the second strip structure 28 decrease in sequence.

In some embodiments, a sum of a distance between the two adjacent strip structures in the first direction and the width of the strip structures is greater than or equal to 30 nm and less than or equal to 200 nm.

In some embodiments, a period of the grating structure is greater than or equal to 300 nm and less than or equal to 600 nm.

In some embodiments, a maximum thickness of the second convex structures is greater than or equal to 300 nm and less than or equal to 600 nm.

Figure 9:
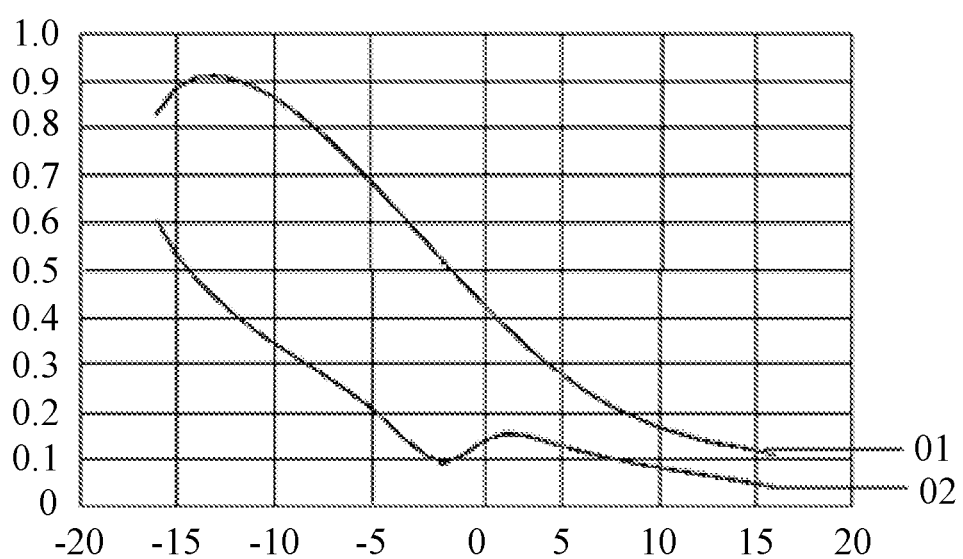
FIG. 9 is a result diagram of T1 diffraction efficiency of a grating structure 01 and a grating structure 02 provided by an embodiment of the present disclosure.

Next, a simulation result of the grating structure provided by the embodiments of the present disclosure is introduced. The second convex structures of the grating structure 01 include the first rubber material and the third rubber material. The grating structure 01 is, for example, similar to the grating structure shown in FIG. 7, that is, the third rubber material 15 forms the first convex structures 2, and the first rubber material covers the first convex structures 2. Second convex structures of a grating structure 02 include a second rubber material. The grating structure 02 is, for example, similar to the grating structure shown in FIG. 6, that is, the second convex structures 7 include the second rubber material 6. Relevant parameters of the grating structure 01 and grating structure 02 are as follows: a refractive index of the first rubber material is 1.9, and the refractive index of both the second rubber material and the third rubber material is 1.7; the period of both the grating structure 01 and the grating structure 02 is 415 nm, a maximum thickness of both the grating structure 01 and the grating structure 02 is 400 nm, a duty cycle of both the grating structure 01 and the grating structure 02 is 0.8, and a maximum width of the second convex structures of both the grating structure 01 and the grating structure 02 in the first direction is 80 nm. Cross sections of the first convex structures of the grating structure 01 are composed of three closely arranged rectangles with the thicknesses of 280 nm, 160 nm and 80 nm respectively. Diffraction efficiency of the grating structure 01 and the grating structure 02 is simulated. The T1-level diffraction efficiency of the grating structure 01 and the grating structure 02 is shown in FIG. 9. It can be seen from FIG. 9 that when the second convex structures include two rubber materials with different refractive indexes. T1-level diffraction light of a blazed grating is optimized by the difference of the refractive indexes of the two rubber materials, and the diffraction efficiency is improved. When the grating structure is applied to an AR display product, efficiency of an optical waveguide grating of the AR display product may be improved, and the overall lighting effect of the AR display product is ultimately improved.

Figure 10:
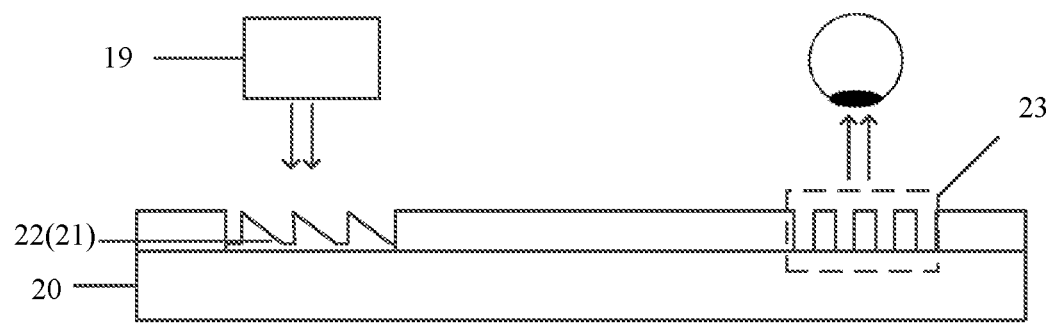
FIG. 10 is a schematic structural diagram of a display device provided by an embodiment of the present disclosure.
Figure 11:
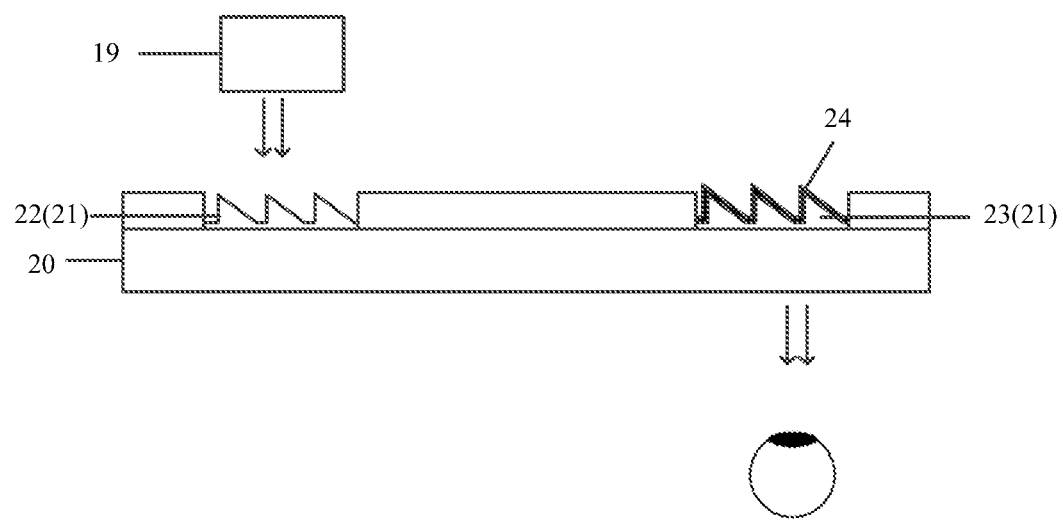
FIG. 11 is a schematic structural diagram of another display device provided by an embodiment of the present disclosure.

A display device provided by an embodiment of the present disclosure, as shown in FIG. 10 and FIG. 11, includes: a display panel 19; an optical transmission layer 20, located on a light emission side of the display panel 19; and the grating structure 21 provided by the embodiment of the present disclosure, located on one side of the optical transmission layer 20 facing the display panel 19.

In some embodiments, as shown in FIG. 10 and FIG. 11, the display device includes a coupled-in grating 22 and a coupled-out grating 23. The coupled-in grating 22 and the coupled-out grating 23 are both located on one side of the optical transmission layer 20 facing the display panel 19.

In some embodiments, as shown in FIG. 10 and FIG. 11, the coupled-in grating 22 is the grating structure 21 provided by the embodiment of the present disclosure.

It should be noted that, as shown in FIG. 10, the coupled-out grating 23 is a strip grating. When only the coupled-in grating 22 is the grating structure 21 provided by the embodiment of the present disclosure, when a user uses the display device, human eyes and the display panel are located on the same side, that is, located on one side of the coupled-in grating 22 and the coupled-out grating 23 facing away from the optical transmission layer 20.

In some embodiments, as shown in FIG. 11, the coupled-out grating 23 is the grating structure 21 provided by the embodiment of the present disclosure.

The display device further includes: a reflective layer 24 located on one side of the grating structure 21 facing away from the optical transmission layer 20.

It should be noted that as shown in FIG. 11, when the coupled-out grating 23 is the grating structure 21 provided by the embodiment of the present disclosure, and when the user uses the display device, the human eyes are located on one side of the optical transmission layer 20 facing away from the coupled-out grating 23.

It should be noted that in FIG. 11, the coupled-in grating 22 is also the grating structure 21 provided by the embodiment of the present disclosure.

In some embodiments, a material of the reflective layer is, for example, aluminum, titanium dioxide, etc.

Figure 12A:
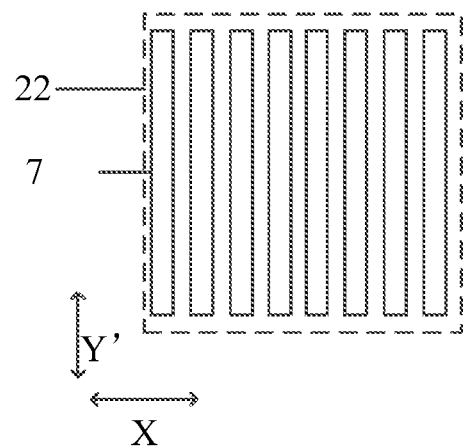
FIG. 12A to FIG. 12C are schematic diagrams of arrangement modes of a coupled-in grating and a coupled-out grating provided by an embodiment of the present disclosure.
Figure 12A:
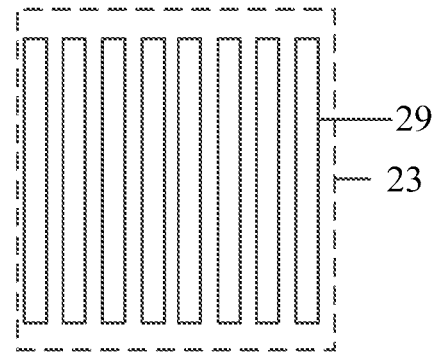
Figure 12B:
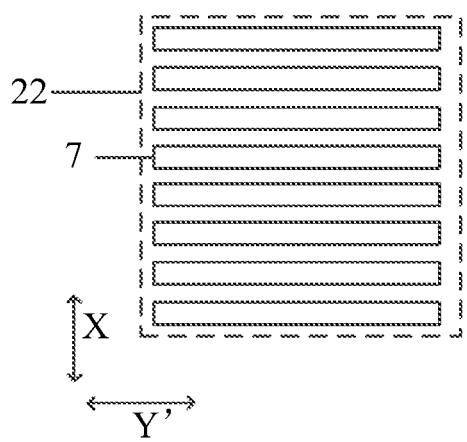
Figure 12B:
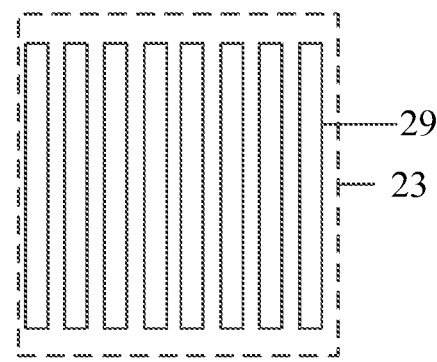
Figure 12C:
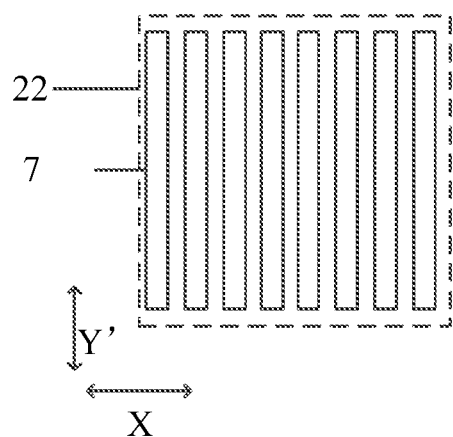
Figure 12C:
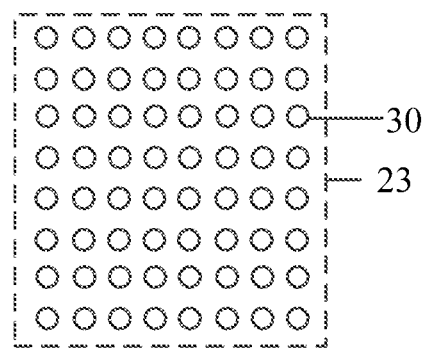

An arrangement mode of the coupled-in grating and the coupled-out grating is illustrated below by taking at least the grating structure provided by the embodiment of the present disclosure as an example, as shown in FIG. 12A to FIG. 12C. In FIG. 12A and FIG. 12B, the coupled-out grating 23 is a one-dimensional grating, for example, the coupled-out grating 23 is a strip grating, including a plurality of strip structures 29 with rectangular cross sections. In FIG. 12A, an arrangement direction of a plurality of second convex structures 7 included by the coupled-in grating 22 is the same as an arrangement direction of the plurality of strip structures 29 included by the coupled-out grating 23, and the plurality of second convex structures 7 included by the coupled-in grating 22 and the plurality of strip structures 29 included by the coupled-out grating 23 are arranged in a first direction X. In FIG. 12B, the arrangement direction of the plurality of second convex structures 7 included by the coupled-in grating 22 crosses the arrangement direction of the plurality of strip structures 29 included by the coupled-out grating 23, the plurality of second convex structures 7 included by the coupled-in grating 22 are arranged in the first direction X, and the plurality of strip structures 29 included by the coupled-out grating 23 are arranged in the second direction Y'. In FIG. 12B, the first direction X is perpendicular to the second direction Y'. Certainly, the coupled-out grating may also be the grating structure provided by the embodiment of the present disclosure. The arrangement mode of the plurality of second convex structures is the same as the arrangement mode of the plurality of strip structures, which is not repeated here. In FIG. 12C, the coupled-out grating 23 is a two-dimensional grating, including a plurality of grating sub-structures 30 arranged in the first direction X and the second direction Y' in an array. The plurality of second convex structures 7 included by the coupled-in grating 22 are arranged in the first direction X.

The display device provided by the embodiment of the present disclosure may be: any product or component with a display function, such as a television and a displayer. It should be understood by a person of ordinary skill in the art that the display device should have other essential constituent parts, which is not repeated here and should not be regarded as limitation to the present disclosure. Implementation of the display device may refer to embodiments of the above grating structure, and repetitions are omitted.

To sum up, according to the grating structure, the preparation method thereof and the display device provided by the embodiments of the present disclosure, the first convex structures are covered with the first rubber material, even if the inclined planes of the first convex structures are uneven surfaces, because the first rubber material has fluidity, after the first rubber material covers the first convex structures, the fluidity of the first rubber material makes the surface of the first rubber material facing away from the first convex structures be the flat surface, so that surfaces of the convex structures composed of the first rubber material and the first convex structures may be flat surfaces. When the second convex structures are formed by using the convex structures composed of the first convex structures and the first rubber material, the inclined surfaces of the second convex structures are made to be flat, so as to avoid affecting the waveguide efficiency of the grating structure.

Although the preferred embodiments of the present invention have been described, those skilled in the art can make additional modifications and variations on these embodiments once they know the basic creative concept. Therefore, the appended claims intend to be explained as including the preferred embodiments and all modifications and variations falling within the scope of the present invention.

Apparently, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A method for preparing a grating structure, comprising:
   forming a plurality of first convex structures arranged in a first direction; and
   forming a first rubber material at least covering the plurality of first convex structures, and forming the grating structure comprising a plurality of second convex structures by using convex structures comprising the plurality of first convex structures and the first rubber material, wherein a surface of the first rubber material facing away from the first convex structures is a flat surface; and the convex structures comprising the plurality of first convex structures and the first rubber material are in one-to-one correspondence with the plurality of second convex structures, shapes of cross sections of the plurality of second convex structures in the first direction are triangles, and the plurality of second convex structures have at least one inclined flat surface.

2. The method according to claim 1, wherein the forming the plurality of first convex structures arranged in the first direction, comprises:
   providing a first substrate, and manufacturing the plurality of first convex structures arranged in the first direction on the first substrate; and
   the forming the first rubber material at least covering the plurality of first convex structures, and forming the grating structure comprising the plurality of second convex structures by using the convex structures comprising the plurality of first convex structures and the first rubber material, comprise:
   forming the first rubber material covering the plurality of first convex structures, and performing a curing process on the first rubber material to form the convex structures comprising the plurality of first convex structures and the first rubber material, so as to obtain a first template, wherein shapes of cross sections of the convex structures in the first direction are triangles, and the convex structures have at least one inclined flat surface; and
   providing a second rubber material, using the first template as an imprinting template, adopting an imprinting process to make the second rubber material form the plurality of second convex structures in one-to-one correspondence with the convex structures, and transferring the plurality of second convex structures to a second substrate to obtain the grating structure.

3. The method according to claim 2, wherein the using the first template as the imprinting template, and adopting the imprinting process to make the second rubber material form the plurality of second convex structures in one-to-one correspondence with the convex structures, comprise:
   coating one side of the first rubber material facing away from the plurality of first convex structures with a template rubber material, using the first template as the imprinting template, and adopting the imprinting process to make the template rubber material form a second template, wherein the second template comprises first grooves in complementary correspondence with the convex structures, shapes of cross sections of the first grooves in the first direction are triangles, and the first grooves have at least one inclined flat surface; and
   coating one side of the second template having the first grooves with the second rubber material, using the second template as the imprinting template, and adopting the imprinting process to make the second rubber material form the plurality of second convex structures in complementary correspondence with the first grooves.

4. The method according to claim 2, wherein the manufacturing the plurality of first convex structures arranged in the first direction on the first substrate, comprises:
   manufacturing the plurality of first convex structures on the first substrate by using an electron beam direct writing process, wherein cross section shapes of the plurality of first convex structures are a shape constructed by a plurality of rectangles arranged closely in sequence; and in a direction perpendicular to the first substrate, thicknesses of the plurality of rectangles are not completely equal, the plurality of rectangles comprise: a first rectangle with a maximum thickness and a second rectangle, on one side of the first rectangle and not adjacent to the first rectangle, with a minimum thickness, and thicknesses of the first rectangle, a rectangle between the first rectangle and the second rectangle, and the second rectangle decrease in sequence.

5. The method according to claim 2, wherein the manufacturing the plurality of first convex structures arranged in the first direction on the first substrate, comprises:
manufacturing the plurality of first convex structures comprising a plurality of strip structures on the first substrate by using an electron beam direct writing process; wherein the plurality of strip structures are arranged at intervals in the first direction, shapes of cross sections of the plurality of strip structures are rectangles; in a direction perpendicular to the first substrate, thicknesses of the plurality of strip structures are not completely equal, the plurality of strip structures comprise: a first strip structure with a maximum thickness and a second strip structure, on one side of the first strip structure and not adjacent to the first strip structure, with a minimum thickness, and thicknesses of the first strip structure, a strip structure between the first strip structure and the second strip structure, and the second strip structure decrease in sequence.

6. The method according to claim 1, wherein the forming the plurality of first convex structures arranged in the first direction, comprises:
providing a first substrate, and manufacturing a plurality of third convex structures arranged in the first direction on the first substrate to obtain a third template; and
using the third template and adopting an imprinting process to make a third rubber material form the plurality of first convex structures in one-to-one correspondence with the plurality of third convex structures, and transferring the plurality of first convex structures to a second substrate; and
the forming the first rubber material at least covering the plurality of first convex structures, and forming the grating structure comprising the plurality of second convex structures by using the convex structures comprising the plurality of first convex structures and the first rubber material, comprise:
coating one sides of the plurality of first convex structures facing away from the second substrate with the first rubber material, and performing a curing process on the first rubber material to form the convex structures comprising the first rubber material and the plurality of first convex structures as the plurality of second convex structures, so as to obtain the grating structure.

7. The method according to claim 6, wherein the using the third template and adopting the imprinting process to make the third rubber material form the plurality of first convex structures in one-to-one correspondence with the plurality of third convex structures, and transferring the plurality of first convex structures to the second substrate, comprise:
coating one sides of the plurality of third convex structures with a template rubber material, using the third template as an imprinting template, and adopting an imprinting process to make the template rubber material form a fourth template, wherein the fourth template comprises second grooves in complementary correspondence with the plurality of third convex structures; and
coating one side of the fourth template having the second grooves with the third rubber material, using the fourth template as the imprinting template, adopting the imprinting process to make the third rubber material form the plurality of first convex structures in complementary correspondence with the second grooves, and transferring the plurality of first convex structures to the second substrate.

8. The method according to claim 6, wherein the manufacturing the plurality of third convex structures arranged in the first direction on the first substrate, comprises:
manufacturing the plurality of third convex structures on the first substrate by using an electron beam direct writing process, wherein cross section shapes of the plurality of third convex structures are a shape constructed by a plurality of rectangles arranged closely in sequence; and in a direction perpendicular to the first substrate, thicknesses of the plurality of rectangles are not completely equal, the plurality of rectangles comprise: a first rectangle with a maximum thickness and a second rectangle, on one side of the first rectangle and not adjacent to the first rectangle, with a minimum thickness, and thicknesses of the first rectangle, a rectangle between the first rectangle and the second rectangle, and the second rectangle decrease in sequence.

9. The method according to claim 6, wherein the manufacturing the plurality of third convex structures arranged in the first direction on the first substrate, comprises:
manufacturing the plurality of third convex structures comprising a plurality of strip structures on the first substrate by using an electron beam direct writing process; wherein the plurality of strip structures are arranged at intervals in the first direction, shapes of cross sections of the plurality of strip structures in the first direction are rectangles; in a direction perpendicular to the first substrate, thicknesses of the plurality of strip structures are not completely equal, the plurality of strip structures comprise: a first strip structure with a maximum thickness and a second strip structure, on one side of the first strip structure and not adjacent to the first strip structure, with a minimum thickness, and thicknesses of the first strip structure, a strip structure between the first strip structure and the second strip structure, and the second strip structure decrease in sequence.

10. The method according to claim 5, wherein a sum of a distance between two adjacent strip structures in the first direction and widths of the strip structures in the first direction is greater than or equal to 30 nm and less than or equal to 200 nm.

11. The method according to claim 1, wherein a period of the grating structure is greater than or equal to 300 nm and less than or equal to 600 nm.

12. The method according to claim 1, wherein a maximum thickness of the second convex structures is greater than or equal to 300 nm and less than or equal to 600 nm.

13. A grating structure, wherein the grating structure is prepared by the method according to claim 1, and
the grating structure comprises: the plurality of second convex structures arranged in the first direction, shapes of cross sections of the plurality of second convex structures in the first direction are triangles, and the plurality of second convex structures have at least one inclined flat surface.

14. A display device, comprising:
a display panel;
an optical transmission layer, located on a light emission side of the display panel; and
the grating structure according to claim 13, located on one side of the optical transmission layer facing the display panel.

15. The display device according to claim 14, wherein the grating structure is a coupled-in grating of the display device; and/or, the grating structure is a coupled-out grating of the display device; and the display device further comprises: a reflective layer located on one side of the grating structure facing away from the optical transmission layer.

* * * * *